United States Patent [19]
Wilkes

[11] Patent Number: 6,064,735
[45] Date of Patent: May 16, 2000

[54] SANITARY PROTECTOR FOR TELEPHONE HANDSETS

[76] Inventor: Elizabeth Wilkes, 1700 W. Tichenor St., Compton, Calif. 90220

[21] Appl. No.: 08/390,102

[22] Filed: Feb. 17, 1995

Related U.S. Application Data

[63] Continuation-in-part of application No. 08/210,035, Mar. 17, 1994, abandoned.

[51] Int. Cl.[7] ........................................................ H04M 1/00
[52] U.S. Cl. ............................................ 379/452; 379/439
[58] Field of Search ................................... 379/452, 451, 379/437, 439

[56] References Cited

U.S. PATENT DOCUMENTS

| | | | |
|---|---|---|---|
| 3,962,555 | 6/1976 | Efan | 379/452 |
| 4,546,217 | 10/1985 | Frehn | 379/452 |
| 4,751,731 | 6/1988 | O'Connor | 379/452 |
| 5,012,513 | 4/1991 | Dale et al. | 379/451 |

*Primary Examiner*—Jack Chiang
*Attorney, Agent, or Firm*—John E. Wagner; Robert C. Smith

[57] ABSTRACT

A sanitary protector for telephone handsets includes a sheet of paper or tissue like material which includes a handle covering portion which allows the user to shield the handset while still on the switch hook of a pay telephone, and remove it following which the mouthpiece and earpiece covering portions are moved to cover the earpiece and mouthpiece for use without any user contact with the telephone handset. The handset may be replaced without direct contact by the user and the protector removed and disposed of. The protector may include small areas of light adhesive on the handle covering portion as well as the earpiece and mouthpiece covering portions.

9 Claims, 5 Drawing Sheets

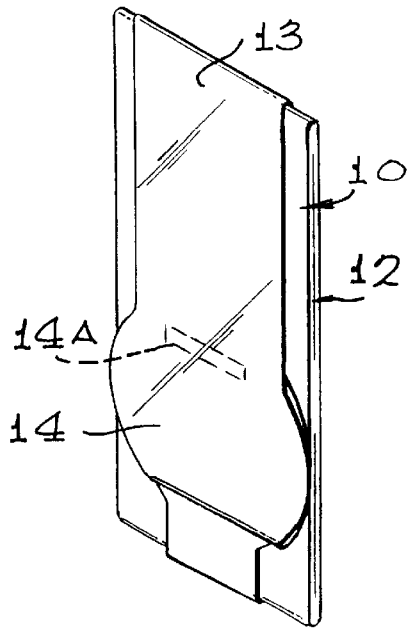
FIG. 2
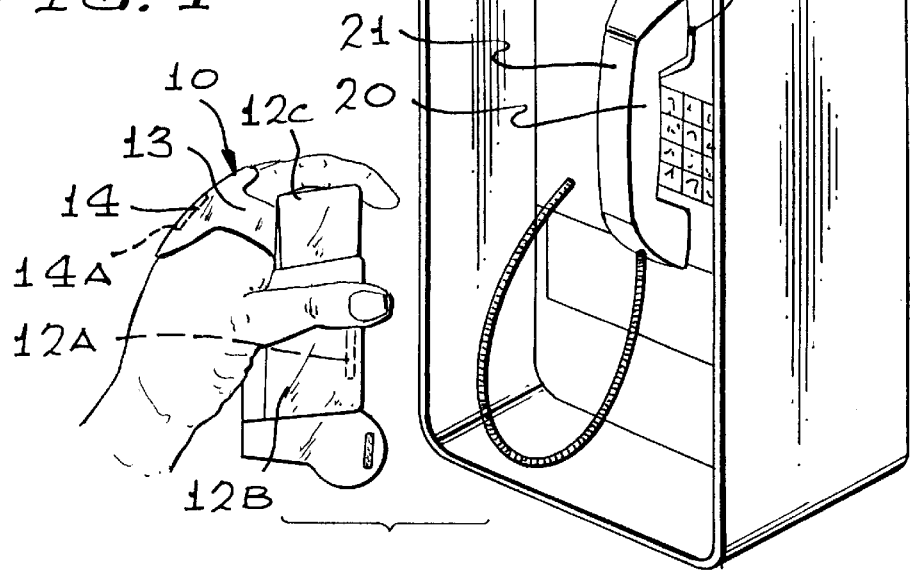
FIG. 4
FIG. 14
| TYPICAL DIMENSIONS | | |
|---|---|---|
| | INCHES | CM. |
| A | 3 3/4 | 9.5 |
| B | 2 1/2 | 6.4 |
| C | 4 | 10.2 |
| D | 1 1/2 | 3.8 |
| E | 4 1/4 | 10.8 |
| F | 1 1/2 | 3.8 |
| G | 2 1/4 | 5.7 |
| H | 6 1/4 | 15.8 |
| I | 3 1/2 | 8.9 |
| J | 12 1/2 | 31.1 |
| K | 2 | 5.11 |
| L | 5 1/4 | 14 |

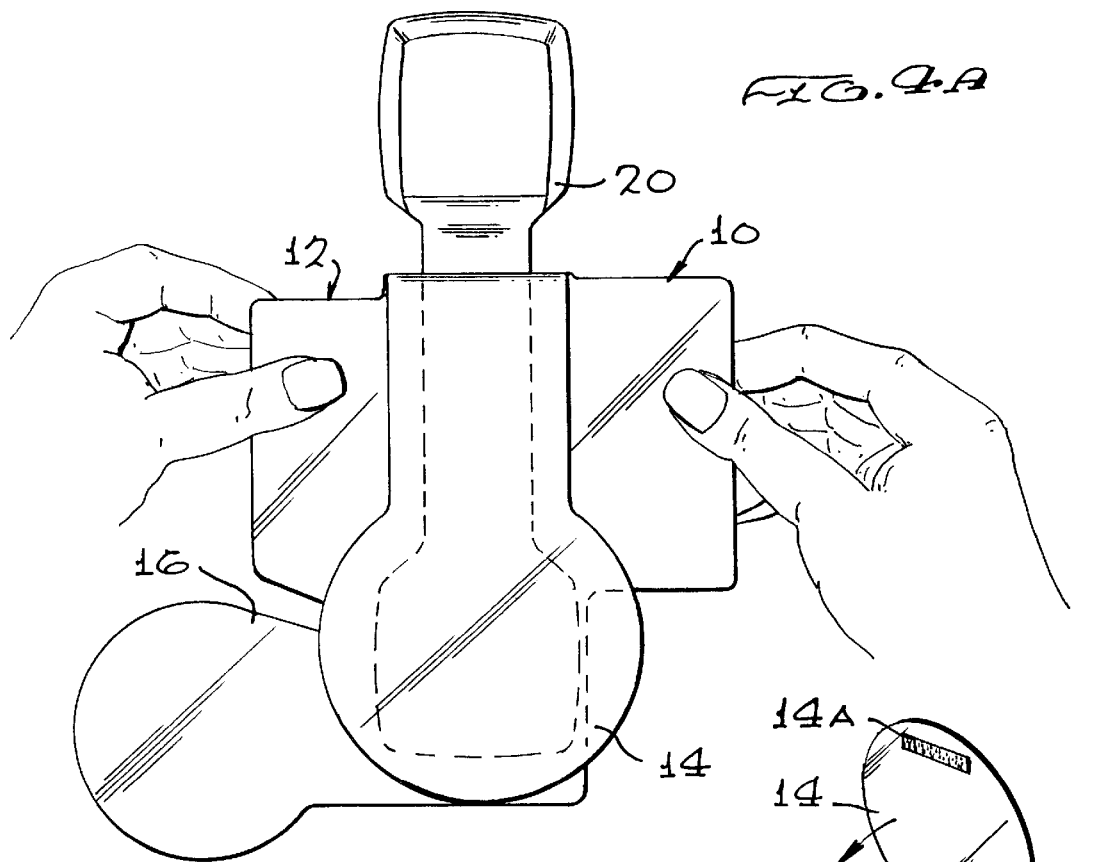
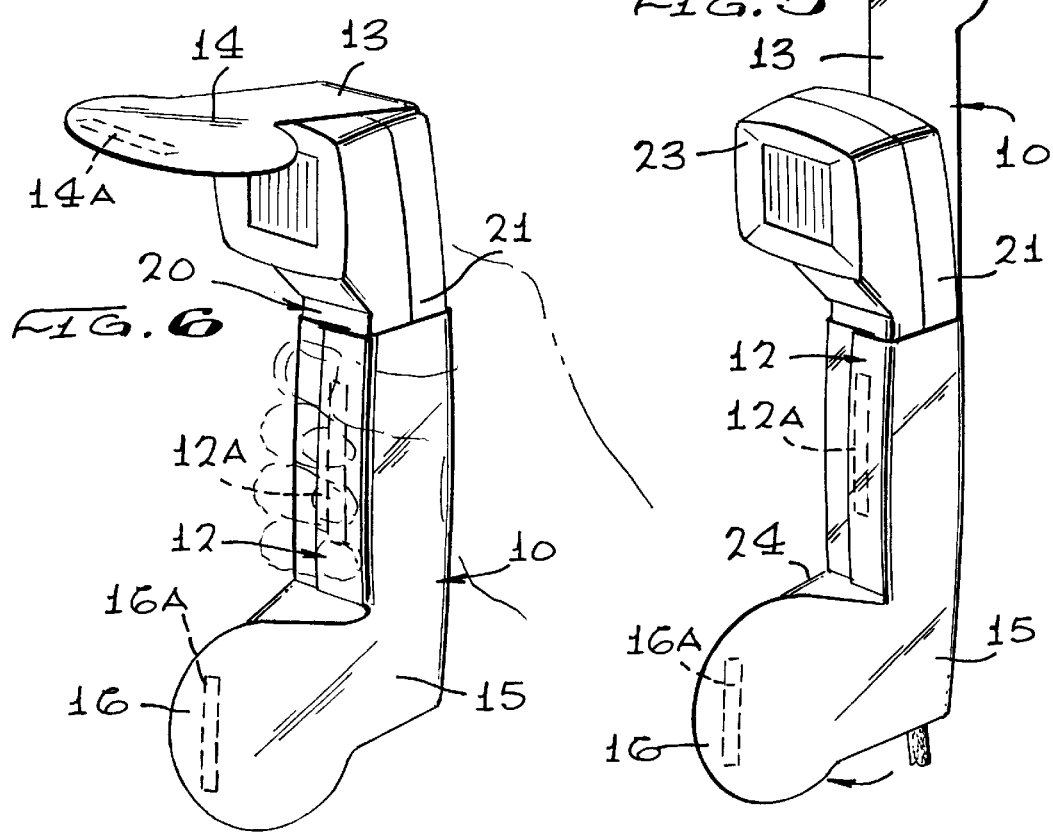

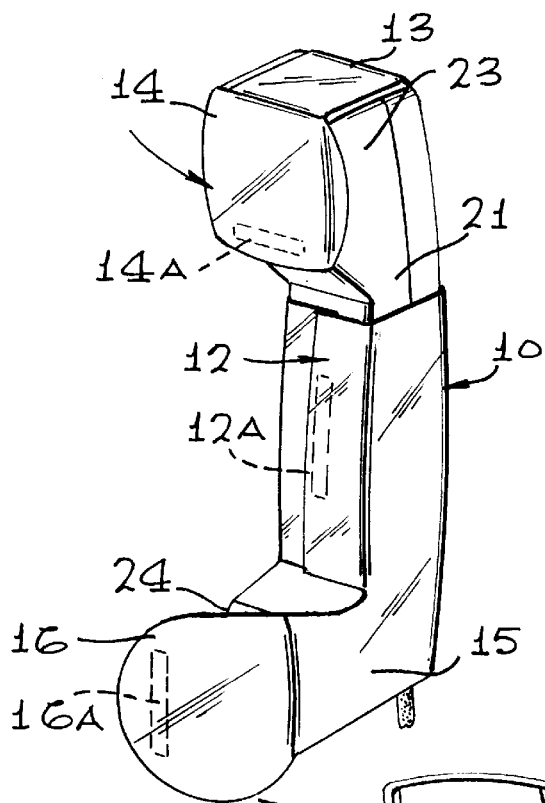
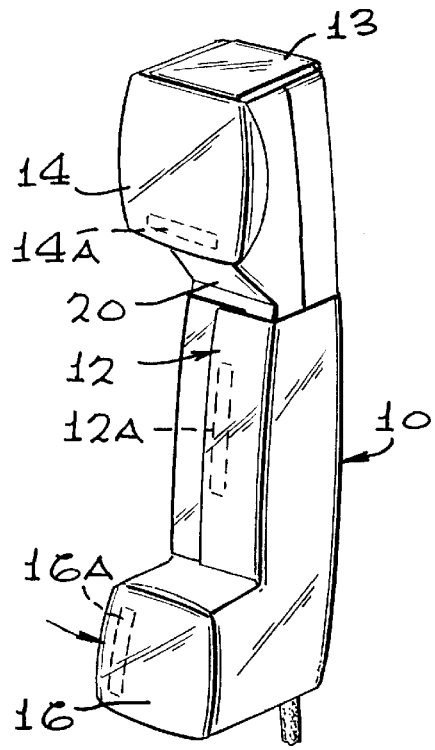
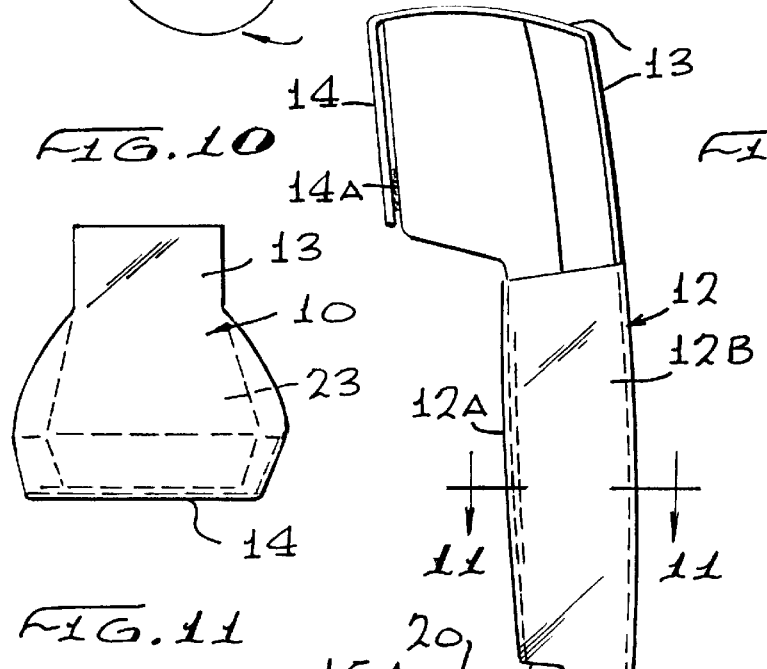
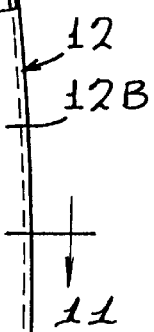
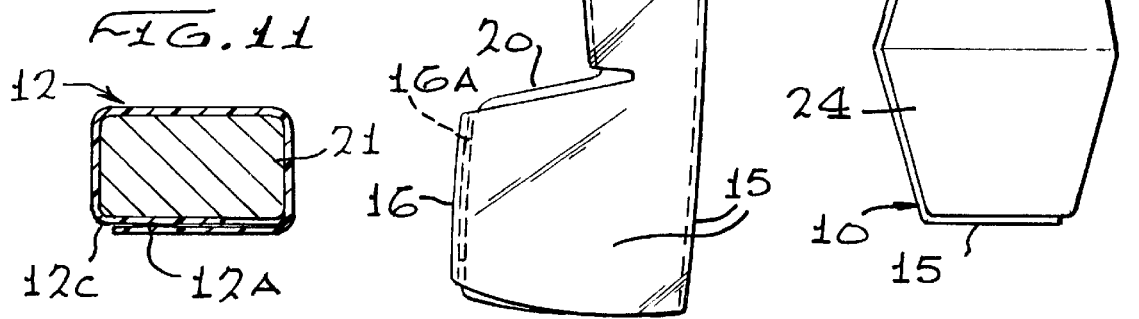
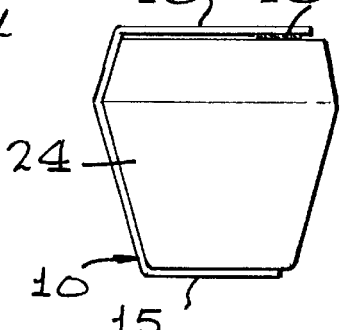

SANITARY PROTECTOR FOR TELEPHONE HANDSETS

This application is a Continuation-in-Part of application Ser. No. 08/210,035 filed Mar. 17, 1994, now abandoned.

BACKGROUND OF THE INVENTION

For many years the need for practical, economical, convenient sanitary protectors for telephone handsets has been recognized. Some observing and caring individuals have seen that millions of people each day find it necessary to grasp a telephone handset, particularly at a telephone pay station, with their hand and bring the handset into close contact with their mouth and ear. The presence of harmful bacteria is not the only problem. Many persons find the closeness of contact by which the user must bring the handset into close intimate contact with the hand, ear and mouth, somewhat offensive.

Telephone technicians, as regular step in their maintenance of telephone pay stations, clean the handset. However, many dozens or hundreds of uses may occur between cleanings by the telephone technicians. For those who are not satisfied with dependence upon such routine cleaning for their personal protection, there has been no truly satisfactory handset cover or means of protection.

Examples of previously patented protective covers are shown in the following patents:

| | | |
|---|---|---|
| 4,819,265 | J. A. Collella | April 4, 1989 |
| 4,546,217 | J. L. Frehn | October 8, 1985 |
| 4,751,731 | D. O'Connor | June 14, 1988 |
| 4,964,161 | A. R. Trowbridge, Jr. | October 16, 1990 |
| 4,953,567 | D. Ward | September 4, 1990 |

A number of other patents have issued for protective covers for telephone handsets. The purpose of these covers is primarily to protect the telephone handset itself from damage. Examples are:

| | | |
|---|---|---|
| 4,736,418 | D. M. Steadman | April 5, 1988 |
| 2,575,280 | B. Long | November 13, 1951 |

Some patented structures are designed to be protective covers for the handset and also some protection for the user. An example of such a patent is:

| | | |
|---|---|---|
| 3,962,555 | D. E. Efaw | June 8, 1976 |

Disposable sanitary covers in a convenient package are disclosed in U.S. Patent:

| | | |
|---|---|---|
| 4,953,703 | L. Virginio | September 4, 1990 |

It has been proposed that sanitary covers be made available to the user via a dispenser in the telephone set itself. Such a concept is disclosed in U.S. Patent:

| | | |
|---|---|---|
| 4,392,028 | R. L. Saxton | July 5, 1983 |

I have examined each of these patents carefully to see if they really filled the need for handset sanitation. I have been troubled with the fact that despite the extensive number of attempts to solve this perennial problem, one still finds practical sanitary protective covers for telephone sets generally unavailable. In fact, I have never to this day seen commercially available sanitary protective covers for telephones even though I have been aware of this problem and need for some time.

Some of the above protective covers are designed to protect the telephone handset from damage, some are of such large size that their attachment to a telephone handset may make the handset cumbersome to use. Some employ a germicide. However, I find that a simple effective protector which covers all contact points of the handset with gauze or tissue is sufficient. Likewise, it appears that the prior art protective covers for handsets are not designed for attachment to the handset in the normal motion used in grasping a pay telephone or other telephone handset whereby the protective cover naturally falls into place for effortless installation and rapid removal in natural hand movements in replacing the handset on its switchhook.

BRIEF DESCRIPTION OF THE INVENTION

Faced with the foregoing state of the art, I have developed a simple compact disposable sanitary protector for the user of telephone handsets, particularly pay telephones. In accordance with my invention, the protectors are carried in a pack which includes one or more portions that may be easily removed, unfolded, used and disposed of conveniently.

The centermost portion of each protector is configured to be grasped by the fingers and thumbs of each hand of the user and placed around the handset before the handset is removed from the switch hook. The handle portion is thereby wrapped around the handset as the handset is removed from its switch hook. The earpiece portion is elongated and connected to the central handle portion and is then flipped forward, the earpiece cover naturally falling over the back of the handset on to the front of the earpiece and may be held on the earpiece by a light adhesive. Thereafter, the mouthpiece portion, which is connected to the central handle portion, will naturally flop sideways over the mouthpiece and carries a small amount of adhesive to hold the mouthpiece section over the mouthpiece during use.

The protectors preferably are made of paper or gauze-like material of length and width substantially greater than the length and width of the hand set and sufficient to prevent any direct contact between any part of the user's body and the handset. The light adhesive keeps the mouthpiece and earpiece portions in contact but allows relatively open paths for sound to travel around the edge of the protector as well as through it. Therefore, the operational performance of the handset is in no way degraded. Similarly, the protector being held only by light adhesive, the user at the completion of his call merely pulls the earpiece and mouthpiece portions away from the handset, replaces the handset on the hanger and draws his fingers away, breaking the adhesive seal around the handle portion and in the process pulling the protector off the handset ready for disposal. The used handset protector may be disposed of in any trash receptacle or replaced in the package in which it came.

BRIEF DESCRIPTION OF THE DRAWING

This invention may be more clearly understood by the following detailed description and by reference to the drawing in which:

FIG. 2 is a perspective view of the protector of this invention as removed from the packet of FIG. 1;

FIG. 3 is a plan view of the protector of the present invention in its unfolded state;

FIG. 4 is a perspective view of a conventional pay telephone station with the sanitary protector of this invention unfolded and ready for placement on the handset of the pay telephone;

FIG. 4A is a view of an alternate, and preferred, arrangement for attaching the unfolded sanitary protector to a telephone handset;

FIG. 5 is a perspective view of the telephone handset as removed with the handle portion of the protector placed on the handset;

FIG. 6 is a perspective view similar to FIG. 5 with the earpiece portion being moved into place;

FIG. 7 is a perspective view of the handset of FIG. 5 with the earpiece portion ready for use and the mouthpiece cover not yet in place;

FIG. 8 is a perspective view of the handset of FIG. 5 ready to use with the sanitary protector fully in place;

FIG. 9 is a side view of the handset of FIG. 8 with the sanitary protector fully in place;

FIG. 10 is a view from the earpiece end of the handset of FIG. 9 with the sanitary protector in place;

FIG. 11 is a sectional view taken along line 11—11 of FIG. 9;

FIG. 12 is a view from the mouthpiece end of the handset of FIG. 9 with the sanitary protector in place;

FIG. 14 is a table giving detailed dimensions of a typical protector according to the invention.

DETAILED DESCRIPTION OF THE INVENTION

Figure 1:
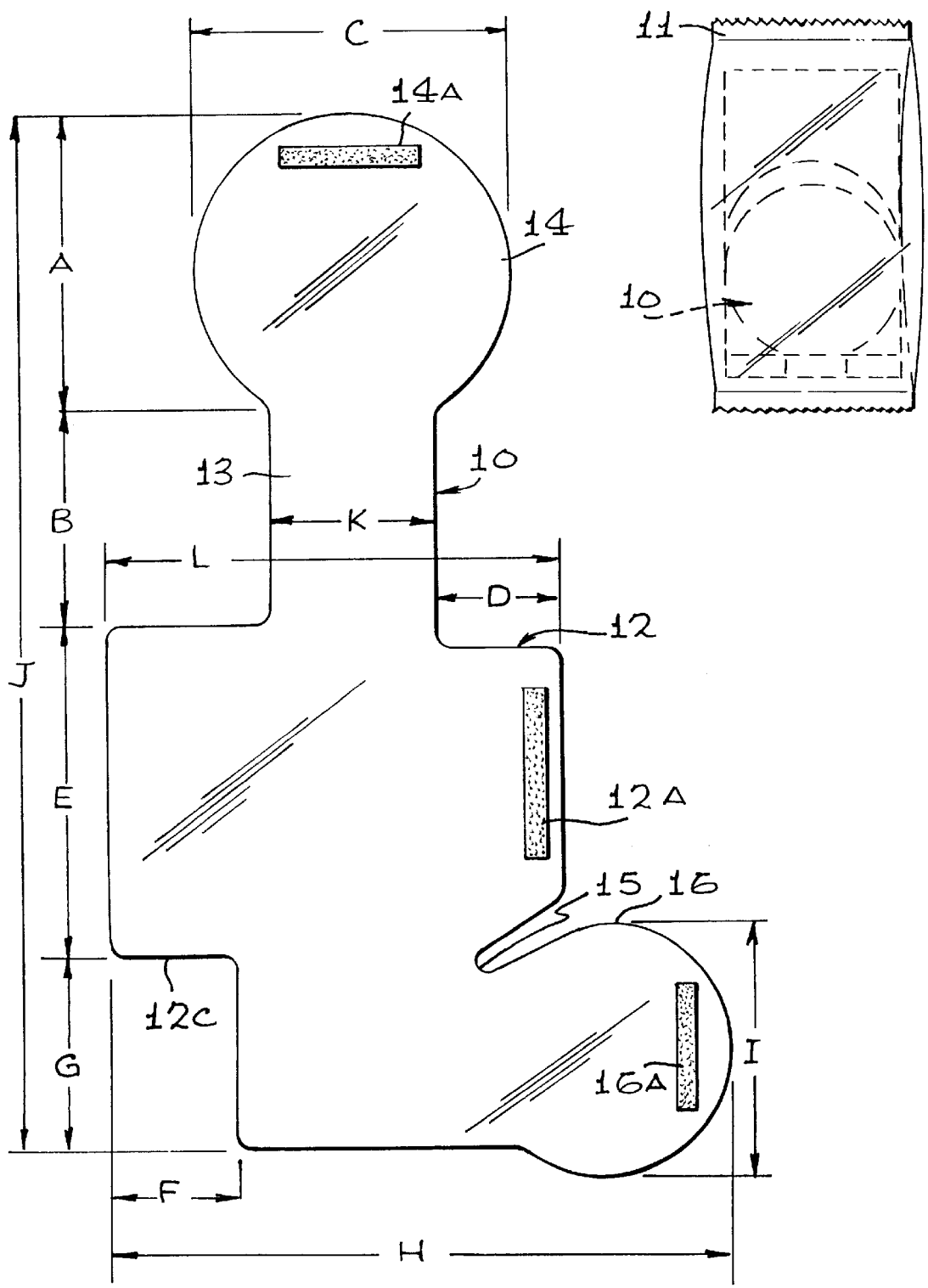
FIG. 1 shows a transparent package enclosing the sanitary protector of this invention.

Referring now to FIGS. 1 through 3, this invention of a foldable protector 10 is shown in FIG. 1 within a transparent package 11 convenient to fit in ladies purses or men's billfolds or in a pocket. A typical dimension of a pack of 6 protectors is 2"×3"×¼" (5.08 mm×7.62 mm×0.625 mm). The packet 11 may be for a single protector 10 or for a multiple number of protectors. The protectors 10 are folded over as shown in FIGS. 1 and 2 and include a handle portion 12 with an upper extension portion 13 with an ear piece enlarged end 14 and an optional adhesive patch 14A, normally covered with a removable paper tab to protect the adhesive, shown in a rectangular pattern in FIG. 2.

FIG. 3 shows the foldable protector 10 completely unfolded and laid out flat. An adhesive patch 12A, normally covered by a removable paper tab, is shown attached to one edge of handle cover portion 12. The mouthpiece cover portion 16 is connected to the central handle cover portion 12 by a lower connecting portion 15. The length of the lower side connecting portion 15 is selected so that the mouthpiece covering portion 16 naturally falls over and covers the mouthpiece 24 of the telephone as the handset is drawn toward the user's face. An adhesive patch 16A, also normally covered by a removable paper tab, is shown located near the outside edge of the mouthpiece portion 16.

The earpiece portion 14 is separated from the handle portion 12 by means of the upper extension portion 13 which is of such length as to wrap around the end of the handset and allow earpiece portion 14 to overlie the earpiece of the handset. The handle portion 12 is of substantial width such that the user may fully wrap it around the end of the handset.

The use of the sanitary protector of this invention is best illustrated in FIGS. 4–8. In FIG. 4 in which the earpiece end 14 and its upper extension portion 13 have been folded back, the handle grasping portion 12 is unfolded so that it fits inside and covers the palm and most of the lengths of the fingers of the user's hand. As also shown in FIG. 4, the user's hand is in the act of reaching forward and grasping the handset 20 of a pay telephone by its central handle portion 21. As the user grasps the handle 21 of handset, and as the user's fingers close about the handle 21 before the handset 20 is removed from its cradle 22, the ends of the handle portion 12 of the protector 10 fold about central handle portion 21 of the handset 20. At the same time, adhesive 12A on an edge region of the handle portion 12 secures the handle portion 12 about the handle 21 of the handset 20.

An alternative, and preferred method of attaching the protector 10 to the handset 20 is shown in FIG. 4A. As in the case of the method of FIG. 4, the earpiece 14 and extension 13 are folded back and the handle grasping portion 12 is spread outwardly with both hands. The user then wraps the portion 12 around the handset handle, securing the adhesive 12A against the opposite side of portion 12.

As the user withdraws the handset 20, the earpiece cover 14 and its connecting portion 13 are flipped forward by the user causing them to naturally fold over the earpiece 23 of the handset 20 as shown in FIGS. 5, 6 and 7. The adhesive 14A will naturally fall into place as shown in FIG. 7. A light tap secures the adhesive 14A to the face of the earpiece 23. By tilting the handpiece slightly, the mouthpiece portion 16 will naturally fall sideways over the mouthpiece 24 of handset 20 as indicated in FIGS. 6, 7 and 8. A light tap on the mouthpiece portion 16 of protector 10 causes the portion 16 to lie over the mouthpiece 24. If adhesive 16A is present on the underside of mouthpiece portion 16, the adhesive spot will temporarily adhere to the mouthpiece 24, and the sanitary protector thereby covers all parts of the handset which would otherwise come in contact with the user's hand, ear and mouth, as shown in FIGS. 8 and 9.

FIG. 9 is a side view of the telephone handset 20 with the sanitary protector 10 fully in place, It will be seen that a part of handle portion 12, designated 12B, wraps around the side, and front of the handset and includes the adhesive patch 12A which adheres to a part 12C, not shown in FIG. 9. Similarly, earpiece 14 is wrapped over the end of the earpiece part of the handset 20 with earpiece portion 14 covering the earpiece of the handset and is held in place with adhesive patch 14A. FIG. 10 is a view of handset 20 as seen from the earpiece end and showing earpiece portion 14 in place.

FIG. 11 is a sectional view taken along line 11-1 of FIG. 9. This view shows the layers of handle portion 12 with part 12B wrapped over part 12C.

FIG. 12 is a view of the handset 20 of FIG. 9 as seen from the mouthpiece end. The mouthpiece portion 16 of protector 10 is shown covering the mouthpiece of the handset and including adhesive patch 16A securing mouthpiece portion 16 to the handset.

The recommended adhesive is a light rubber cement adhesive similar to that use on office or desk devices known as "Post-its" of the 3-M Company of Minneapolis, Minn.

Removal of the protector 10 is accomplished merely by lifting the overhanging edges of the earpiece and mouthpiece portions 14 and 16, replacing the handset 20 on its cradle or hook switch and drawing the hand away with the protector 10 in the palm of the hand. It may be crumpled and/or disposed of in any acceptable manner for waste paper. This includes disposal in it's packet 11, if it is individually packed.

Figure 13:
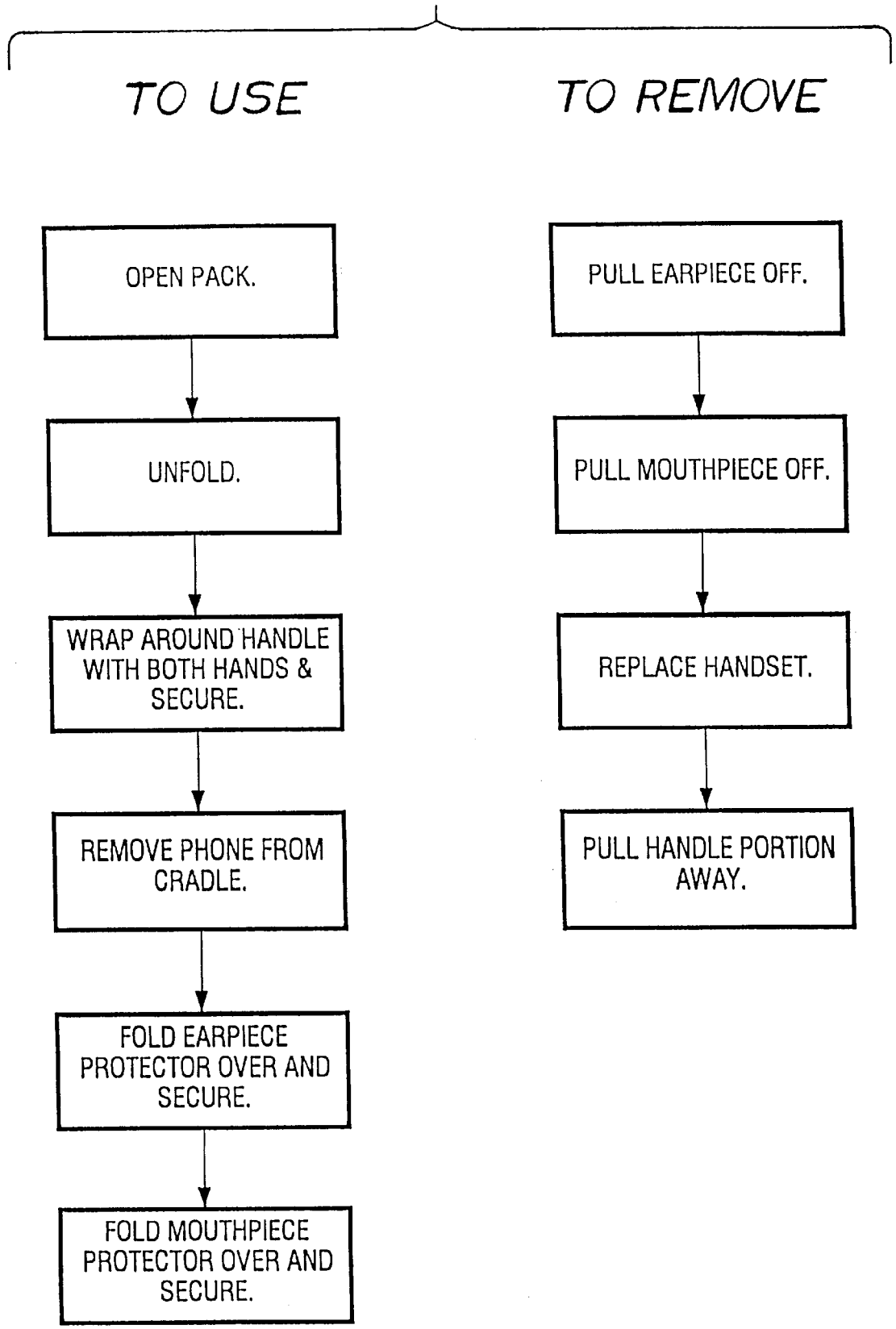
FIG. 13 is a flow diagram showing the steps of using and disposing of the protector of this invention.

The process for utilizing this invention including the steps of attaching it to a pay phone handset, using the telephone, replacing the handset and removing and disposing of the protector 10 all without direct contact with the telephone handset is shown in the flow diagram of FIG. 13.

This invention may be used on any combined handset whether it be on a vertical switch hook as in a pay telephone or on a conventional domestic telephone cradle. The material selected is sound transparent or permeable paper or tissue paper.

By way of explanation and not limiting, typical dimensions of protector 10 as compared to the dimensions of the Model K25 common telephone handset of the AT&T and used on countless pay telephone sets is shown below. The lettered dimensions are those shown on FIG. 3. These and other dimensions of protector 10 are shown on the table, FIG. 14.

The above described embodiments of the present invention are merely descriptive of its principles and are not to be considered limiting. The scope of the present invention instead shall be determined from the scope of the following claims including their equivalents.

What is claimed is:

1. A telephone handset protector for the normal user contact areas of the handle, the mouthpiece and earpiece of the telephone handset comprising:
   a flat unitary sheet of sound permeable material with:
   a) a central portion extending laterally sufficiently wide to substantially encircle the handle of a telephone handset;
   b) a mouthpiece portion sufficient in size to cover the face of the mouthpiece of a telephone;
   c) an earpiece portion sufficient in size to cover the face of the earpiece of the telephone handset; and
   d) said mouthpiece and earpiece face covering portions each connected to said central portion by respective connecting portions of said sheet of sufficient length to allow said mouthpiece face covering and earpiece face covering portions to normally extend from the rear of a telephone handset and to fall in place over the respective mouthpiece and earpiece faces of the telephone handset;
   e) said connecting portions to said mouthpiece face covering portion and said earpiece face covering

|  | PROTECTOR 10 | AT&T HANDSET MODEL K25 |
|---|---|---|
| Overall length (J) | 12¼" | 8⅛" |
| Earpiece portion width (C) | 4" | 2⅜" |
| Mouthpiece portion width (I) | 3½" | 2⅜" |
| Handle portion length (E) | 4¼" | 4" |
| Handle distance, around | — | 4" approx. |
| Central portion 12 transverse dimension (D) | 1½" |  |
| Distance around earpiece of handset from handle grasping portion (over top) (A + B) | 6¼" | 4" |
| Extension portion 13 Distance from handle to mouthpiece (B) | 2½" | 1" |
| Lower side connecting portion 15 | ½" | — |

It may be seen from the above dimensions that:
a) the length of the upper connecting portion 13 is sufficient to allow the earpiece covering portion 14 to fall over the top and front of the telephone handset earpiece;
b) the transverse dimension of the central handle covering portion 12 of the protector 10 is significantly greater than the distance around the telephone handset handle portion 21;
c) the length of the lower side connecting portion 15 is sufficient to allow the mouthpiece covering portion 16 to fall over the telephone handset mouthpiece; and
d) the dimensions of both the earpiece covering and mouthpiece covering portions 14 and 16 of the protector 10 are larger than the dimensions of the faces of the telephone handset mouthpieces and earpieces to provide assured covering while in use.

portion each extending laterally substantially less than the lateral dimension of said central portion;
said protector including an adhesive on each of said central portion, said mouthpiece portion and said earpiece portion of said protector.

2. A protector in accordance with claim 1 wherein said protector is of tissue paper.

3. A protector in accordance with claim 1 wherein said central portion has a length approximating the length of the handle portion of a telephone handset between its earpiece and mouthpiece.

4. A protector in accordance with claim 1 wherein said central portion has a transverse dimension at least as great as the peripheral distance around the handle portion of a telephone handset between its earpiece and mouthpiece.

5. A protector in accordance with claim 4 wherein said transverse dimension of the central portion is at least 5 inches.

6. A telephone handset protector for protecting a user from the normal user contact areas of the handset including the handle, the mouthpiece and the earpiece comprising:

a unitary flat sheet of sound permeable material of length and width substantially greater than the length and width said handset and having:
  a) a central portion of sufficient width to substantially encircle the handle of said handset;
  b) a mouthpiece portion of area at least equal to the area of said handset mouthpiece;
  c) an earpiece portion of area at least equal to the area of said handset earpiece;
  d) said mouthpiece portion and said earpiece portion each being connected to said central portion by respective connection portions of said sheet of sufficient length that when said central portion encircles the handle of said handset, said earpiece portion and said mouthpiece portion extend from the rear of said handset and are movable to fall in place over the respective mouthpiece and earpiece faces of said handset;
  e) said connection portions to said mouthpiece covering portion and said earpiece covering portion each being of width substantially less than the width of said central portion.

7. A protector in accordance with claim 6 including an adhesive material adjacent edges of said mouthpiece portion and said earpiece portion for engagement with said handset to temporarily protect the user from contact with said handset.

8. A sanitary protector for telephone handsets which handsets include a mouthpiece and an earpiece connected by a handle, said protector comprising:

a unitary flat sheet of sound permeable tissue configured to include a central portion of sufficient width to encircle said telephone handset handle such that the central portion is adapted to lie in the open palm and fingers of the user's hand for grasping the handle of said handset such that said sheet is wrapped around said handle to prevent direct contact between the user's hand and said handset;

said sheet being further configured and dimensioned to provide:
  mouthpiece and earpiece portions connected to said central portion by respective connection portions of said sheet and foldable with respect to the rest of said sheet and separated by the central portion of said sanitary protector to present portions folded over the telephone handset and lying between a user and the faces of said mouthpiece and earpiece during ordinary use of said telephone handset, said connection portions each being of width substantially less than the width of said central portion; and adhesive means for securing at least a portion of said central portion in apposition embracing the handle portion of said handset comprising an adhesive coated strip positioned on an edge region of said central portion.

9. A sanitary protector for telephone handsets according to claim 8 including additionally:

means for releaseably securing at least an edge portion of said mouthpiece and earpiece portions of said sheet in position against the earpiece and mouthpiece portion of said handset comprising:
  adhesive means positioned on the edges of said mouthpiece and earpiece portions.

* * * * *